(12) United States Patent
Meyn

(10) Patent No.: US 6,254,472 B1
(45) Date of Patent: Jul. 3, 2001

(54) APPARATUS FOR SUSPENDING POULTRY WITH THE LEGS FROM A HANGING CONVEYOR

(75) Inventor: Pieter Meyn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 09/493,852

(22) Filed: Jan. 28, 2000

(51) Int. Cl.[7] .................................................. A22C 21/00
(52) U.S. Cl. ............................................. 452/188; 452/182
(58) Field of Search .................... 452/188, 187, 452/177, 182

(56) References Cited

U.S. PATENT DOCUMENTS

| | | | |
|---|---|---|---|
| 3,680,173 | * | 8/1972 | Martin .................................. 452/188 |
| 4,272,863 | * | 6/1981 | Parker, Jr. .............................. 452/188 |
| 5,108,345 | * | 4/1992 | Harben, III et al. ................. 452/188 |
| 5,129,857 | | 7/1992 | Keiter et al. . |
| 5,134,971 | * | 8/1992 | Krienke et al. ...................... 452/177 |
| 5,290,187 | | 3/1994 | Meyn . |
| 5,453,045 | * | 9/1995 | Hobbel et al. ....................... 452/182 |
| 5,514,033 | * | 5/1996 | Berry ................................... 452/182 |
| 5,672,100 | | 9/1997 | Nielsen et al. . |

FOREIGN PATENT DOCUMENTS

| | | | |
|---|---|---|---|
| 60866 | * | 3/1968 | (DE) .................................... 452/177 |
| 533288A | | 3/1924 | (EP) . |
| 145077A | | 6/1985 | (EP) . |
| 259920 | * | 3/1988 | (EP) .................................... 452/182 |
| 7412044A | | 3/1976 | (NL) . |
| 9200676A | | 11/1993 | (NL) . |
| 1003230C | | 12/1997 | (NL) . |
| 9220223A | | 11/1992 | (WO) . |

OTHER PUBLICATIONS

Netherlands Patent Office Search Report, Sep. 16, 1999.
Netherlands Patent Office Search Report, Sep. 14, 1999.

* cited by examiner

Primary Examiner—Willis Little
(74) Attorney, Agent, or Firm—Dority & Manning

(57) ABSTRACT

An apparatus for suspending poultry by the feet from an overhead conveyor has pairs of cooperating strings for gripping the poultry by the feet in an upside-down hanging position. Check means are applied to check the position of the feet with respect to the strings in the hanging position of the poultry, and to provide a control signal that depends thereon.

21 Claims, 2 Drawing Sheets

APPARATUS FOR SUSPENDING POULTRY WITH THE LEGS FROM A HANGING CONVEYOR

BACKGROUND OF THE INVENTION

The invention relates to an apparatus for suspending poultry by the feet from an overhead conveyor.

In preparation of the mechanical slaughter and further treatment poultry is generally suspended by the feet from an overhead conveyor. To this day, this suspending takes place primarily manually, since the poultry is delivered alive and thus in strongly changing positions. At the moment, attempts are being made to automate the suspending of poultry.

SUMMARY OF THE INVENTION

It is an object of the present invention to provide an apparatus with which part of the problem of how to automatically suspend poultry can be solved. Additional objects and advantages of the invention will be set forth in part in the following description, or may be obvious from the description, or may be learned through practice of the invention.

For this purpose the apparatus according to the present invention is characterized by pairs of cooperating strings for gripping the poultry by the feet in an upside-down hanging position. They are then supplied to the overhead conveyor respectively in preparation of that, whereby check means are applied to check the position of the feet with respect to the strings in the hanging position of the poultry. A control signal that depends thereon is also provided.

During an initial stage, the feet of the poultry are received and gripped between pairs of cooperating strings having a gap between them. After placing the poultry upside-down by means of the strings, it is eventually passed to the overhead conveyor in a hanging position. Suspended from the overhead conveyor the poultry then gets the desired treatments. The passing of the poultry to the overhead conveyor can take place directly or indirectly, for instance via automatic overhangers.

For a correct execution of the direct or indirect passing to the overhead conveyor and for the mentioned treatments, it is essential that the poultry is correctly passed on to or suspended from the overhead conveyor. This means that both feet are correctly placed in, for example, the mentioned overhangers or in suspending-hooks that generally form part of the overhead conveyor. However, this can only occur when the feet are correctly positioned between the cooperating strings. To this end, the present invention applies check means to check the position of the feet of the suspended poultry with respect to the strings. Depending on the measured position an appropriate control signal is emitted. When the check means, for instance, have established that the position of the feet is not suited to pass the poultry to an automatic overhanger or to the overhead conveyor, the control signal can induce the removal of the poultry out of the process.

In a preferred embodiment of the apparatus according to the present invention it holds that the check means comprise height-check means to determine whether the feet have the correct height position with respect to the strings. Such height-check means allow to determine whether the feet are placed too high between the strings (in which case the risk exists for instance that the poultry will be suspended too high in the overhead conveyor), or are placed too low between the strings (in which case there is for instance a change that one or both feet will not at all be gripped by the overhead conveyor). When with respect to at least one of the feet a deviation from the correct height position is established, the previously mentioned control signal will be provided.

As remarked above, a deviation of the correct height position can occur both upwardly and downwardly. Therefore, a preferred embodiment of the apparatus according to the invention is characterized in that the height-check means on the one hand comprise upper height-check means for the detection of feet, of which the height position exceeds a predetermined acceptable upper value. Also, the height-check means comprise lower height-check means for the detection of feet, of which the height position falls below a predetermined acceptable lower value.

The upper value and lower value of the height position determines the allowable trajectory, within which the position of the feet is suited to be passed on to, for instance, the overhead conveyor. The upper height-check means cause the control signal when the feet are in too high a position, whereas the lower height-check means cause the concerning control signal when the feet are in too low a position.

In this connection, it is preferred from a constructive pint of view that the upper height-check means comprise a sensor for the left foot and a sensor for the right foot, whereby activation of at least one of these sensors already leads to a desired control signal.

When neither of the feet occupies too high a position, they will pass under the concerning sensors, and the sensors will fail to respond. When, however, at least one of the feet occupies too high a position, the concerning sensor will provide the desired control signal. This is also true when both feet occupy too high a position.

In a simple and effectively operating embodiment of the apparatus according to the invention, the sensors consist of stops that are swivable around transverse to the strings oriented vertical turning-axles. When a foot which is placed too high engages such a stop, this will rotate with respect to its horizontal swivelling axis and cause hereby the desired control signal. The swivelling motion can take place with a counteracting spring action, yet it is also possible that the swivelling motion occurs with a countering gravity force.

Since already the activation of at least one of the sensors leads to the desired control signal, it is also possible that the stops for the left foot and the right foot are shaped in one piece. In this way, a control signal will be provided when only the left foot, only the right foot or both feet occupy too high a position.

As remarked earlier, a check must be made not only whether the feet occupy too high a position, it is also important to check whether the feet occupy too low a position. To this end, the apparatus according to the invention is preferably characterized in that the lower height-check means comprise a sensor for the left foot and a sensor for the right foot, whereby non-activation of at least one of the sensors causes the desired control signal. These sensors function essentially the same as the sensors forming part of the upper height-check means. There is, however, one noticeable difference. When looking at the upper height-check means, the desired control signal is induced when at least one of the sensors is activated. With the lower height-check means, the desired control signal is induced, however, when at least one of the sensors is not activated. Feet that occupy the correct height position shall not cooperate with the sensor of the upper height-check means but will cooperate with the sensors of the lower height-check means (when the poultry when passing the check means would not hang upside-down, this would be reversed).

Except for checking the height position, the lower check means can also be used to check whether both feet have a staggered position when seen in the direction of transportation of the strings (that is to say whether one of the feet precedes or follows the other foot when seen in the direction of transportation). Looking at the situation that one of the feet runs prior to the other foot, whereas both feet occupy the correct height position, the leading foot shall activate the corresponding sensor, whereas the other sensor shall not be activated simultaneously, but later. Normally, this will require that the desired control signal shall again have to be provided, since this staggered placement of the feet prevents correct placement of the feet in, for instance, the overhead conveyor.

In this connection, an embodiment of the apparatus according to the invention is preferred, in which a waiting station connects to the strings. It has a central stationary plate and tow in a horizontal plane swivable side plates, which under the influence of the control signal are movable between a waiting position, wherein together with the central stationary plate they each form a slit that connects to the gap between two cooperating strings, and a release position, wherein the slit between the central stationary plate and the side plate widens in the transport direction. In response to the control signal, the side plates can swivel to the releasing position allowing the poultry to fall down. This is for instance the case when, corresponding to what is said above, deviating height positions of one or both feet of the poultry are measured. In addition, the waiting station has the important advantage that a staggered positioning of the feet when looked at in direction of transportation of the strings (without deviating height position) is automatically compensated by this waiting station. A difference in signal which is generated between both the (left and right) lower height-check means (sensors) can then be used as a minimum required waiting time which the poultry must spend in the waiting station, in order to concurrently move the feet and shift them from the waiting station into, for instance, a suspending-hook of an overhead conveyor.

Corresponding to what is mentioned about the sensors of the upper height-check means, it is possible that the sensors of the lower height-check means are formed by stops which are swivable about vertical swivelling axes, which are oriented transversely with respect to the strings.

In the above, the control signal leading to the separation of poultry from the process had been mentioned several times. In order to render such a function feasible, an alternative embodiment of the apparatus according to the invention must be mentioned, in which the strings for releasing the feet are separable under the influence of the control signal. In the non-separated position, the feet of the poultry are locked between the strings. When the control signal is there, the strings, or a part thereof, move apart, and the poultry falls down without being suspended from the overhead conveyor. In this connection, means can be applied to repeatedly transport the poultry to the entrance of the apparatus with its feet pointing to the strings in order to be engaged thereby and gripped. In this embodiment, however, compensation of a staggered position of the feet in the direction of transportation, as is possible with the waiting station, is hardly feasible.

The invention shall hereafter be elucidated with reference to the drawing, showing an embodiment of the apparatus according to the invention.

DETAILED DESCRIPTION

The apparatus for suspending poultry by the legs from an overhead conveyor has pairs of cooperating strings 1, 2, 3 and 4. Between said strings 1 to 4, the feet of the poultry are engaged and gripped in a manner which is not further described. Thereafter, the strings 1 to 4 are led through such part of the apparatus that, again in a manner which is not further described, the poultry is hung upside-down in a hanging position. In this hanging position, the poultry must in the end be transferred directly or indirectly to a not-shown overhead conveyor which can have conventional suspending-hooks.

Figure 1:
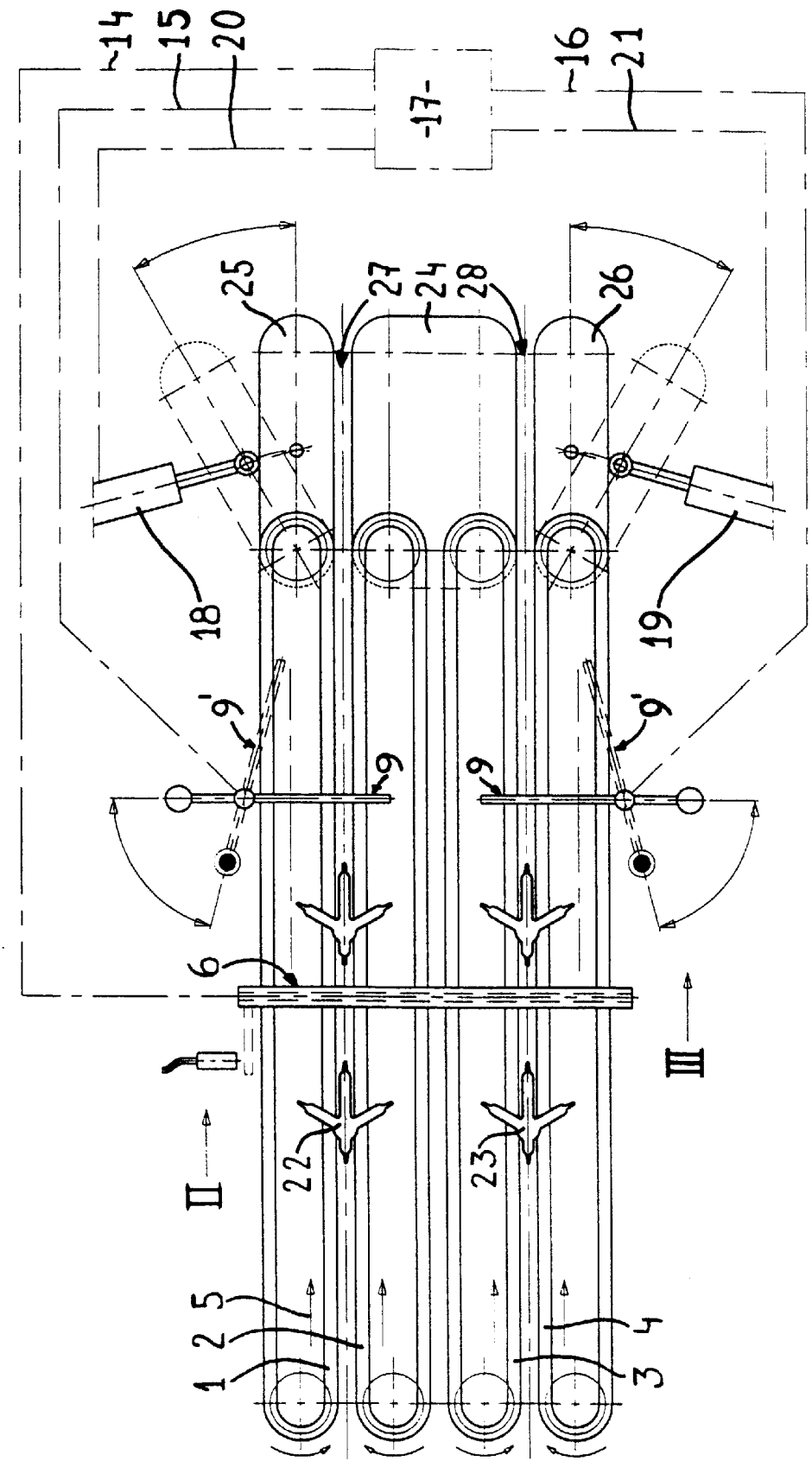
FIG. 1 shows a schematic top view of a part of an embodiment of the apparatus according to the invention.

After engaging and gripping the feet and prior to passing on the poultry to the overhead conveyor, a check is made with respect to the position of the feet of the poultry as compared to the strings 1 to 4. The part of the apparatus in which this check is performed is schematically shown in FIG. 1. The direction of transportation of the strings is indicated with arrow 5.

Above the strings 1 to 4, there are upper height-check means 6 which (see FIG. 2) in the shown embodiment are made from a stop plate 7 which is swivable about a horizontal swivelling axis 8, which is directed transversely with respect to the strings 1 to 4. Furthermore, lower height-check means 9 are applied consisting of (see FIG. 3) two stop pins 10 and 11 which are swivable about vertical swivable axes 12 and 13 respectively (for instance to position 9'). The upper height-check means 6 and the lower height-check means 9 are connected with processing and control unit 17 by means of signal cables 14, 15 and 16.

Adjacent to the strings 1–4 is a central stationary plate 24 and two side plates 25 and 26 which are swivable in a horizontal plane (plane of the drawing of FIG. 1). By means of cylinder piston assemblies 18 and 19, which are connected with the processing and control unit 17 by means of control cables 20 and 21, the side plates 25 and 26 can be moved between a waiting position (shown in solid lines) in which they define slits 27 and 28 in cooperation with the stationary plate 24 which connect to the slits between cooperating string 1 and 2, respectively 3 and 4, and the releasing position (shown in broken lines), in which the slits 27 and 28 increase in width when seen in the direction of transportation (arrow 5).

The operation of the apparatus shown in FIG. 1 is further explained with reference to FIGS. 2 and 3.

In FIG. 2a, the right foot 22 and the left foot 23 of a suspended bird is shown gripped between the strings 1, 2 and 3, 4 respectively. In the situation according to FIG. 2a, the feet 22 and 23 occupy the correct height position allowing easy transfer to, for instance, an overhead conveyor. In the correct height position, the feet pass under the stop plate 7 of the upper height-check means 6, such that no signal is provided to the processing and control unit 17.

In the situation according to FIG. 2b, the right foot 22 has too high a position, and shall engage the stop plate 7. This will cause rotation of the stop plate 7 along swivelling axis 8 causing the providing of a signal to the processing and control unit 17 via cable 14. The processing and control unit 17 shall thereafter control the cylinder piston assemblies 18 and 19 via the control cable 20 and 21 causing the side plates 25 and 26 to move apart and release the concerning bird in order for it to fall down.

FIG. 2c concerns a corresponding situation in which now the left foot 23 occupies too high a position.

Finally, FIG. 2d shows a situation in which both the left foot 23 and the right foot 22 occupy too high a position causing again a swivelling of the stop plate 7 and causing an activation of the cylinder piston assemblies 18 and 19.

Figure 2:
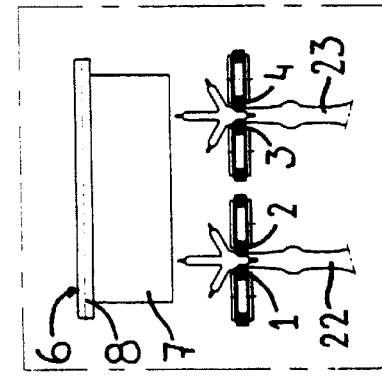
FIG. 2 shows an elevation view of different situations involving the upper height-check means.
Figure 2:
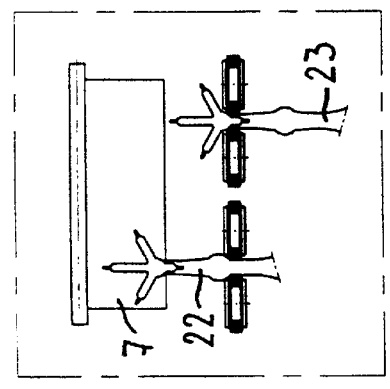
Figure 2:
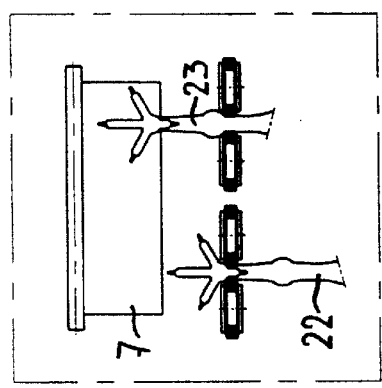
Figure 2:
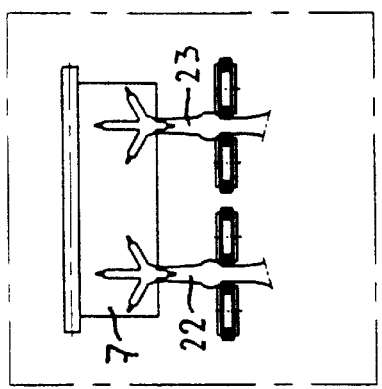

By means of the height-check means 6 which are schematically shown in FIG. 2, it is therefore possible to check an upwardly deviating position of the feet 22 and 23 with respect to the strings 1 to 4.

Figure 3:
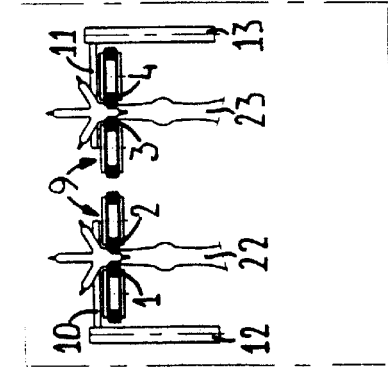
FIG. 3 shows an elevation view of different situation involving the lower height-check means.
Figure 3:
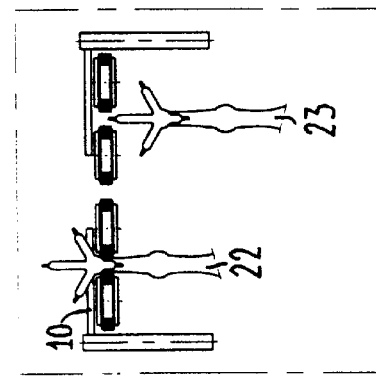
Figure 3:
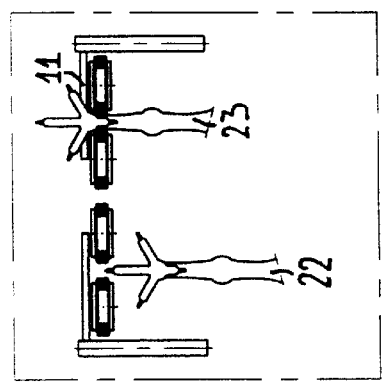
Figure 3:
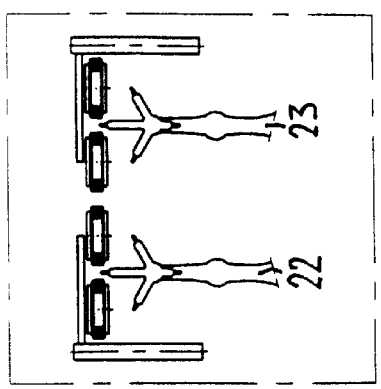

FIG. 3 shows the part of the apparatus at which the lower height-check means 9 are located. In FIG. 3a both the right foot 22 and left foot 23 are in a correct height position allowing the effortless transfer to an overhead conveyor. Both feet 22 and 23 engage the stop pins 10 and 11 which shall both rotate along their corresponding swivelling axis 12 and 13. The activation of both lower height-check means 9 is registered by the processing and control unit 17 such that the cylinder piston assemblies 18 and 19 are not activated.

In the situation corresponding to FIG. 3b, the left foot 23 is in too low a position. This will cause only the stop pin 10 to rotate along its rotational axis 12, whereas the stop pin 11 will not rotate along its rotational axis 13. This situation is registered by the processing and control unit 17 through the signal cables 15 and 16 leading to the transmission of a control signal over the control cables 20 and 21 to the cylinder piston assemblies 18 and 19, causing the moving apart of the side plates 25 and 26 in order to allow the bird to fall down again. A similar situation is shown in FIG. 3c, however, here the right foot 22 occupies too low a position.

Finally, FIG. 3 shows a position in which both feet 22 and 23 have too low a position, causing neither of the lower height-check means 9 to be activated. Also, this situation causes the processing and control unit 17 to activate the cylinder piston assemblies 18 and 19 via the signal cables 20 and 21, in order to move apart the side plates 25 and 26 and to remove the bird from the process.

It is remarked that, apart from a differing height position of the feet 22 and 23, also a staggered position when looked in the direction of transportation 5 of the strings, is of importance. In such a staggered position when either the right foot 22 or the left foot 23 is leading, in principle a situation develops that is equal to the situation shown in FIG. 3b and 3c respectively. A leading right foot 22 shall engage the stop 10, whereas the left foot 23 has not reached yet the stop 11. In the alternative, a leading left foot 23 shall already engage the stop 11, whereas the trailing right foot 22 will not have reached the stop 10. Also in these circumstances, the processing and control unit 17 could supply the desired control signal to the cylinder piston assemblies 18 and 19 in order to cause the removal of the bird from the process. It is, however, preferable that a signal difference that is generated (different time that the signal occurs) between both lower height-check means is used as a minimal waiting time for the feet in the waiting station in order to shift the feet simultaneously out of the waiting station. The difference in position of the feet is therewith corrected instead of the concerning bird being removed from the process.

The invention is not limited to the embodiment which is discussed above, and can be varied in numerous ways within the scope of the appended claims. It should be appreciated by those skilled in the art that various modifications and variations can be made in the present invention without departing from the spirit and scope of the invention.

What is claimed is:

1. An apparatus for suspending poultry by the feet, comprising:
   a pair of cooperating strings for gripping the feet of the poultry and hanging the poultry in an upside-down hanging position, the cooperating strings having a gap between them;
   check devices disposed proximate to the pair of cooperating strings, the check devices configured to check the position of the feet of the poultry with respect to the pair of cooperating strings in the upside-down hanging position of the poultry; and
   wherein the check devices generate a control signal depending upon the position of the feet of the poultry with respect to the pair of cooperating strings in the upside-down hanging position of the poultry.

2. The apparatus of claim 1, wherein the check devices comprise height-check devices disposed to determine whether the feet of the poultry have the correct height position with respect to the pair of cooperating strings in the upside-down hanging position of the poultry.

3. The apparatus of claim 2, wherein the height-check devices comprise an upper height-check mechanism disposed to determine whether the feet of the poultry exceed a predetermined acceptable upper value of distance from the cooperating strings.

4. The apparatus of claim 3, wherein the upper height-check mechanism comprises a left upper sensor for the left foot of the poultry and a right upper sensor for the right foot of the poultry, whereby activation of at least one of the upper sensors causes a desired control signal.

5. The apparatus of claim 4, wherein the sensors comprise stops that are transverse to the direction of travel of the cooperating strings and swivelable about an axis transverse to the direction of travel of the cooperating strings.

6. The apparatus for suspending poultry by the feet of claim 5, wherein the stops for the left and right foot of said poultry comprising a single stop to detect both the left and right foot.

7. The apparatus of claim 6, wherein the control signal causes the strings to separate and the feet of the poultry to be released.

8. The apparatus of claim 6, further comprising:
   a waiting station connected to the pair of cooperating strings, the waiting station comprising:
   a central stationary plate; and
   two side plates swivelable in a horizontal plane relative to the central stationary plate, the side plates swivelable in response to the control signal between a waiting position wherein the side plates and the central plate form two slits that extend the gap between the cooperating strings, and a release position wherein the two slits widen in the direction of transportation of the poultry.

9. The apparatus of claim 8, further comprising cylinder piston assemblies configured to swivel the two side plates.

10. The apparatus of claim 2, wherein the height-check devices comprise a lower height-check mechanism to determine whether the feet of the poultry exceed a predetermined acceptable lower value of distance from the cooperating strings.

11. The apparatus of claim 10, wherein the lower height-check mechanism comprises a lower left sensor for the left foot and a lower right sensor for the right foot.

12. The apparatus of claim 11, wherein the sensors comprise stops that are transverse to the direction of travel of the cooperating strings and swivelable about an axis perpendicular to the direction of travel of the cooperating strings.

13. The apparatus of claims 12, wherein the control signal causes the strings to separate and the feet of the poultry to be released.

14. The apparatus of claim 12, further comprising a waiting station connected to the pair of cooperating strings, the waiting station comprising:
 a central stationary plate, and
 two side plates swivelable in a horizontal plane relative to the central stationary plate, the side plates swivelable in response to the control signal between a waiting position wherein the side plates and the central plate form two slits that extend the gap between the cooperating strings, and a release position wherein the two slits widen in the direction of transportation of the poultry.

15. The apparatus of claim 14, further comprising cylinder piston assemblies configured to swivel the two side plates.

16. The apparatus of claim 2, wherein the height-check devices comprise an upper height-check mechanism to determine whether the feet of the poultry exceed a predetermined acceptable upper value of distance from the cooperating strings, and a lower height-check mechanism to determine whether the feet of the poultry exceed a predetermined acceptable lower value of distance from the cooperating strings.

17. An apparatus for suspending poultry by the feet, comprising:
 a pair of cooperating strings for gripping the feet of the poultry and hanging the poultry in an upside-down hanging position, the cooperating strings having a gap between them;
 check means proximate to the pair of cooperating strings for checking the position of the feet of the poultry with respect to the pair of cooperating strings in the upside-down hanging position of the poultry;
 said check means generating a control signal, the value of the control signal depending upon the position of the feet of the poultry with respect to the pair of cooperating strings in the upside-down hanging position of the poultry; and
 a waiting station connected to the pair of cooperating strings, the waiting station comprising:
 a central stationary plate; and
 two side plates swivelable in a horizontal plane relative to the central stationary plate, the side plates swivelable in response to the control signal between a waiting position wherein the side plates and the central plate form two slits that extend the gap between the cooperating strings, and a release position wherein the two slits widen in the direction of transportation of the poultry.

18. The apparatus of claim 17, wherein the check means comprises height-check means for determining whether the feet of the poultry have the correct height position with respect to the pair of cooperating string in the upside-down hanging position of the poultry, wherein the height-check means further comprise:
 upper height-check means for determining whether the feet of the poultry exceed a predetermined acceptable upper value of distance from the cooperating strings; and
 lower height-check means for determining whether the feet of the poultry exceed a predetermined acceptable lower value of distance from the cooperating strings.

19. The apparatus of claim 18, wherein the upper height-check means comprises a left upper sensor for the left foot of the poultry and a right upper sensor for the right foot of the poultry, whereby activation of at least one of the upper sensors causes a desired control signal, and wherein the lower height-check means comprises a left lower sensor for the left foot and a right lower sensor for the right foot.

20. The apparatus of claim 19, wherein the upper sensors comprise a single stop that is transverse to and swivelable about an axis transverse to the direction of travel of the cooperating strings, and wherein the lower sensor comprises stops that are transverse to the direction of travel of the cooperating strings and swivelable about an axis perpendicular to the direction of travel of the cooperating strings.

21. The apparatus of claim 20, further comprising cylinder piston assemblies configured to swivel the two side plates.

* * * * *